United States Patent [19]

Ernst et al.

[11] Patent Number: 5,622,583
[45] Date of Patent: Apr. 22, 1997

[54] METHOD OF PRODUCING A FILTER INSERT

[75] Inventors: Volker Ernst, Sachsenheim; Arthur Klotz, Remseck; Michael Kolmeder, Dingolfing; Bernhard Wimmer, Rimbach, all of Germany

[73] Assignee: Filterwerk Mann & Hummel GmbH, Ludwigsburg, Germany

[21] Appl. No.: 294,844

[22] Filed: Aug. 29, 1994

[30] Foreign Application Priority Data

Aug. 27, 1993 [DE] Germany .................. 43 28 846.4

[51] Int. Cl.⁶ ............................ B32B 31/04; B32B 31/18
[52] U.S. Cl. .................... 156/204; 156/227; 156/270; 156/271; 156/474; 156/524; 156/526; 156/578; 118/315
[58] Field of Search .................... 156/204, 227, 156/270, 474, 524, 526, 578, 525, 529, 271; 118/315; 55/521; 210/493.5

[56] References Cited

U.S. PATENT DOCUMENTS

| | | | |
|---|---|---|---|
| 2,653,888 | 9/1953 | Hyman | 156/271 |
| 3,532,582 | 10/1970 | Franke | 156/271 |
| 3,535,190 | 10/1970 | Loomer et al. | 156/548 |
| 4,288,278 | 9/1981 | Akao | 156/474 |
| 4,419,241 | 12/1983 | Hoffman | 210/493.5 |
| 4,764,234 | 8/1988 | Smits et al. | 156/578 |
| 4,940,500 | 7/1990 | Tadokoro et al. | 156/204 |

FOREIGN PATENT DOCUMENTS

| | | |
|---|---|---|
| 260267 | 3/1990 | European Pat. Off. . |
| 1121438 | 1/1962 | Germany . |
| 1121438 | 7/1962 | Germany . |
| 1299534 | 7/1969 | Germany . |
| 2807546 | 8/1979 | Germany . |
| 2927497 | 1/1981 | Germany . |
| 3128546 | 2/1983 | Germany . |
| 3622955 | 1/1988 | Germany . |
| 8908176 | 9/1989 | Germany . |
| 4138890 | 6/1993 | Germany . |
| 4208862 | 9/1993 | Germany . |
| 4223723 | 1/1994 | Germany . |
| 463940 | 11/1968 | Switzerland . |
| 466957 | 2/1969 | Switzerland . |
| 2018148 | 10/1979 | United Kingdom . |
| 2020995 | 11/1979 | United Kingdom . |

Primary Examiner—Michele K. Yoder
Attorney, Agent, or Firm—Evenson, McKeown, Edwards & Lenahan P.L.L.C

[57] ABSTRACT

A filter insert and a method for producing the same in which the filter insert has an accordion-folded filter medium. In a first operating step, folded edges are impressed on the filter medium. Subsequently, by glue application devices which are provided with glue application nozzles, at least two glue beads are applied to the surface of the filter medium and the folding is carried out subsequently. At least one of the glue application devices is movable transversely to the transport direction of the filter medium.

10 Claims, 3 Drawing Sheets

METHOD OF PRODUCING A FILTER INSERT

BACKGROUND OF THE INVENTION

The present invention relates to a filter insert and a method for producing a filter insert comprising a filter medium folded in an accordion-type shape, in which the bent edges are first impressed in a first operating step. At least two glue beads are applied to the surface of the filter medium by glue application devices which are provided with glue application nozzles, and the folding is subsequently carried out.

From German Patent Document DE-AS 12 99 534, a filter insert is known which is made of folded filter material. This filter insert has a glue mass which extends transversely to the fold edges and is connected with the filter material. This glue mass is used as a spacer.

Known filters of this type for motor vehicle engines also use glue masses or glue beads as spacers. These glue beads are also applied without interruption to the sides of the filter medium during the production. During an accordion-type folding of the filter medium, these glue beads form the lateral sealing of the filter insert.

A filter insert of this type is manufactured, for example, by the firm FILTERWERK MANN+HUMMEL GMBH and is sold under the designation C 34 109/1. These so-called "rectangular" filters are expedient where installation conditions permit such a filter. Rectangular filters are available in various dimensions and filtering capacities.

As a result of the progressive development in automobile construction in the endeavor to obtain compact vehicles, there is less available space for an air filter in the engine compartment of a vehicle. The space is often not sufficient for a conventional rectangular cartridge so that sometimes two filters or two cartridges are arranged at different points.

SUMMARY OF THE INVENTION

It is an object of the present invention to provide a method for producing a filter insert, and to provide a filter insert which is optimally adapted to the given space conditions.

This and other objects are achieved by the present invention which provides a method for producing a filter insert having a filter material folded in an accordion-type shape, the method comprising the steps of transporting the filter material in a transport direction, impressing folded edges of the filter material, applying at least two glue beads to a surface of the filter medium using glue application devices which are provided with glue application nozzles, the step of applying including moving at least one of the glue application devices transversely to a transport direction of the filter material, and subsequently folding the filter medium.

An advantage of the production method of the present invention is that it achieves any structure of the filter insert because of the fact that the glue application device, which produces the lateral boundary of the filter insert and its lateral sealing, can be moved transversely to the transport direction of the filter medium. As a result, filter inserts may also be produced which have, for example, a trapezoidal or triangular outer contour.

Circular-disk-shaped filter elements are known from Puetsch, United Kingdom Patent Application No. GB 2,018, 148. These filter elements are punched out of a filter material plate. However, a disadvantage of this known production method is the high proportion of the waste material to be disposed of as well as the absence of a surrounding sealing for the punched-out filter element. This sealing can be applied later only at increased cost.

An advantageous development of the invention provides two application nozzles mounted on the glue application device and which produce two glue beads that extend in parallel. These glue beads have a spacing of, for example, from 3 to 5 mm and inbetween form the separating line for two filter inserts. This method is therefore distinguished by an almost 100% utilization of the filter medium.

Another embodiment of the invention provides application nozzles that are offset with respect to one another in the transport direction. Since the application nozzles have diameters of up to 10 mm, this offset arrangement permits the production of glue beads which extend in parallel to one another and have a much narrower spacing than would be permitted by the diameter of the application nozzles in the case of a side-by-side arrangement.

Another particularly advantageous embodiment of the invention provides another glue application device which can also be moved transversely with respect to the transport direction. In this embodiment, the two glue application nozzles are arranged to be offset in the transport direction.

In certain embodiments that use two glue application devices, the productivity of an installation for the production of filter inserts is further increased since one of the glue application devices can always operate alternately, while the other glue application device returns to its starting position.

A further embodiment of the invention uses a cutting device which cuts the folded filter medium provided with the glue beads into individual filter elements. The cutting device cuts through the filter medium transversely to the transport device. The control signal for the cutting operation is triggered by a sensor which scans the respective glue bead end or the glue bead start or a measuring point arranged on the filter medium and generates a control pulse in response to this signal.

In certain embodiments of the invention, the glue application devices are movable in the transport direction. The glue application devices are mounted on an XY-carrier and as a result any desired contour of the filter insert can be produced.

A filter which is produced according to the method of the invention has the advantage that its outer contour can be optimally adapted to the existing space, whereby one or both of its end faces may be angled. There is also the possibility of angling only part of one end face in order to adapt the contour of the filter insert to the edges of the filter housing.

Other objects, advantages and novel features of the present invention will become apparent from the following detailed description of the invention when considered in conjunction with the accompanying drawings.

BRIEF DESCRIPTION OF THE DRAWINGS

FIG. 1b shows a side view of the filter insert illustrated in FIG. 1a.

DETAILED DESCRIPTION OF THE DRAWINGS

Figure 1A:
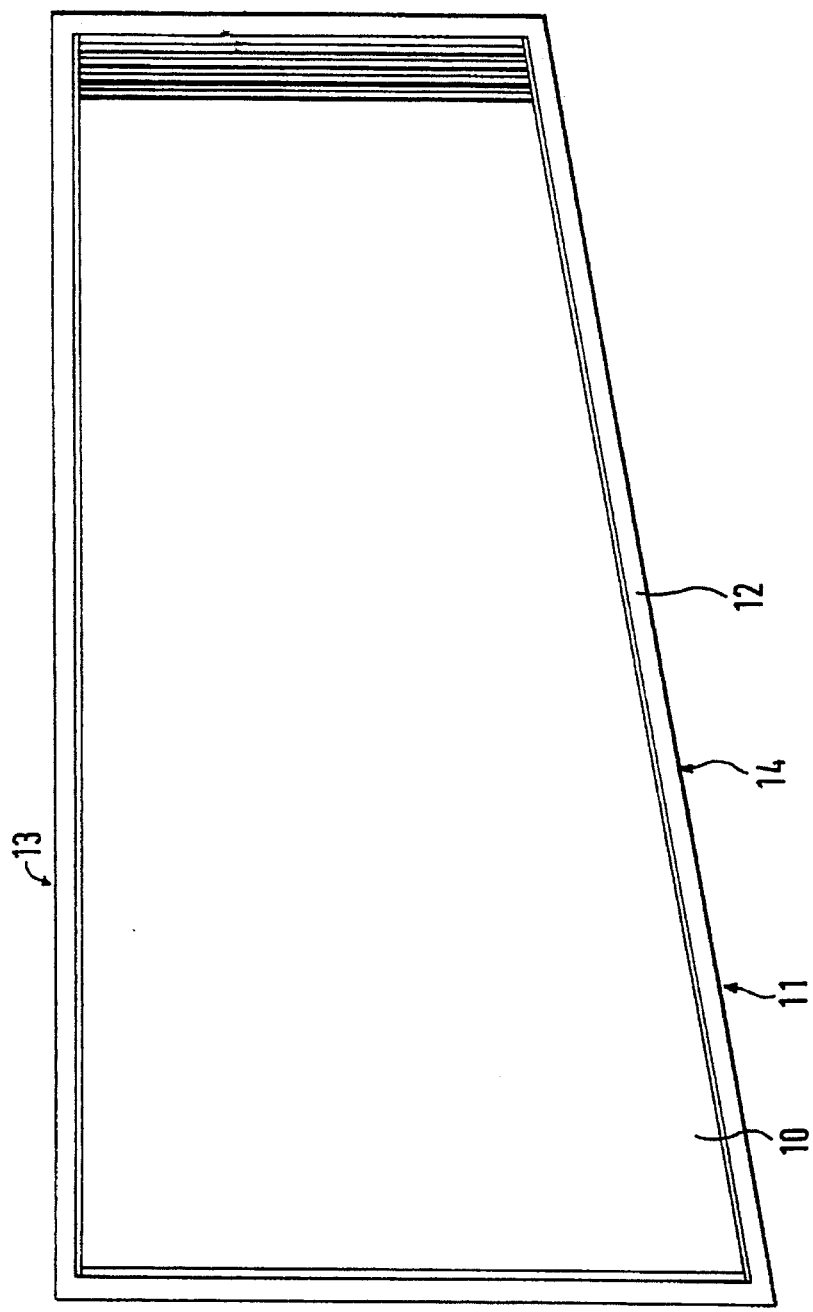
FIG. 1a shows a top view of a filter insert constructed in accordance with an embodiment of the present invention.

The filter insert 11 according to FIG. 1a comprises a filter element 10 which is folded in an accordion (zig-zag) shape. This filter element 10 may, for example, be a filter paper. The filter insert 11 is provided with a surrounding PUR foam seal 12. While the upper face 13 extends at a right angle with respect to the fold, a lower face 14 has an inclined course and is adapted, for example, to the installation conditions of a housing which is not shown here.

Figure 1B:
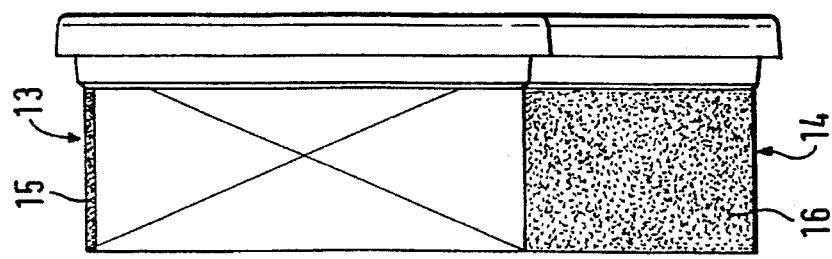

The side view illustrated in FIG. 1b of this filter insert 11 shows a glue bead 15 on the upper face 13. This glue bead 15 seals off the filter insert 11 on face 13. On lower face 14, a continuous glue bead 16 seals off the filter insert 11 on this face 14 so that, viewed from the top, filter pockets are formed. The top view according to FIG. 1a does not show the glue beads 15, 16 because they are covered by the PUR foam seal 12.

Figure 2A:
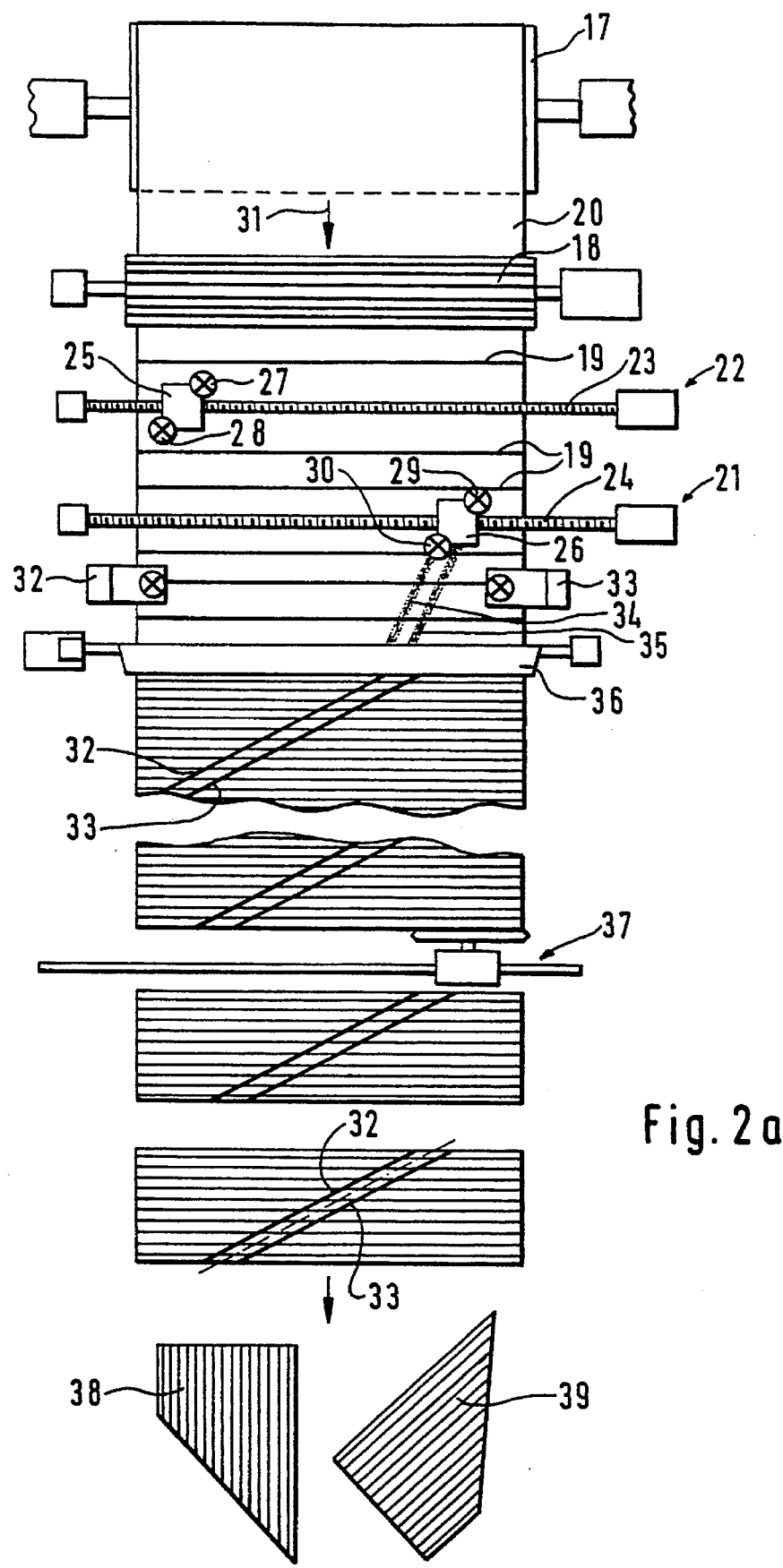
FIG. 2a shows schematically an apparatus for carrying out the method of the present invention for producing a filter insert.

A device for carrying out the method for producing the filter insert illustrated in FIG. 1 is shown in the schematic FIG. 2a. First, a filter medium or filter paper is taken off a drum 17 and is guided between a lower and an upper impressing roller 18. The lower impressing roller is not visible in the drawing, but is situated directly under the impressing roller 18. By means of these impressing rollers, formed edges 19 are impressed into the filter element. In addition, naps, reinforcing beads or spacers may also be impressed. Subsequently, the filter material 20 is provided with the required glue beads. For this purpose, two glue application devices 21, 22 are provided. These each comprise a spindle 23, 24, on which carrier heads 25, 26 are situated. On each of these carrier heads 25, 26, two glue application nozzles 27, 28, 29, 30 are arranged. The application of the glue beads 32, 33, 34, 35 takes place while the filter material 20 is moved through under the glue application devices 21, 22 according to the arrow 31. In this case, the spindles 23, 24 are rotated correspondingly so that the carrier heads 25, 26 carry out a transverse movement. In the illustration of FIG. 2a, the carrier head 26 is active; that is, the glue application nozzles 29, 30 are opened up and produce two glue beads on the filter material 20 passing through. The carrier head 25 has moved back into its starting position, that is, into the position on the left side. The glue application nozzles 27, 28 are still closed.

The carrier heads 25, 26 may also be moved by a belt or toothed belt, as provided in certain embodiments. Particularly when a toothed belt is used, it is possible to position the carrier heads with very high precision. In addition, in the case of a belt or toothed belt drive, the adjusting speed is slightly higher than in the case of a threaded spindle.

As soon as the glue beads 34, 35 are completed, carrier head 25 will become active, while carrier head 26 is moved from the right-side end position to the left-side starting position. Thus, one glue application device is essentially always operative.

With the present invention, it is also possible to produce the filter inserts or carry out the method using only one glue application device. However, for this purpose, it is necessary to move this glue application device from the end position to the starting position at a very high speed in order to—if the glue application nozzles are not stopped—avoid the application of glue to a longer transition piece. The application of glue to two to three folds transversely to the transport direction may be acceptable. If glue is applied to more folds, this transition piece cannot be used and would result in unnecessary waste.

Two further glue application devices 32, 33 are also provided which provide glue beads 34, 35 on the two faces.

After the application of all glue beads, the accordion-type folding of the filter material is carried out by a folding device 36.

Subsequently, the filter material 20 arrives in a curing furnace, which is not shown here, and, after the curing, is cut to length by a cutting device 37. Then, the rectangular filter elements are cut through by a suitable cutting device, for example, a saw or a separating device, between the glue beads 32, 33. The rough filter elements 38, 39 are thus produced with respect to their form. Subsequently, these are provided with the PUR foam seal 12 illustrated in FIG. 1.

Figure 2B:
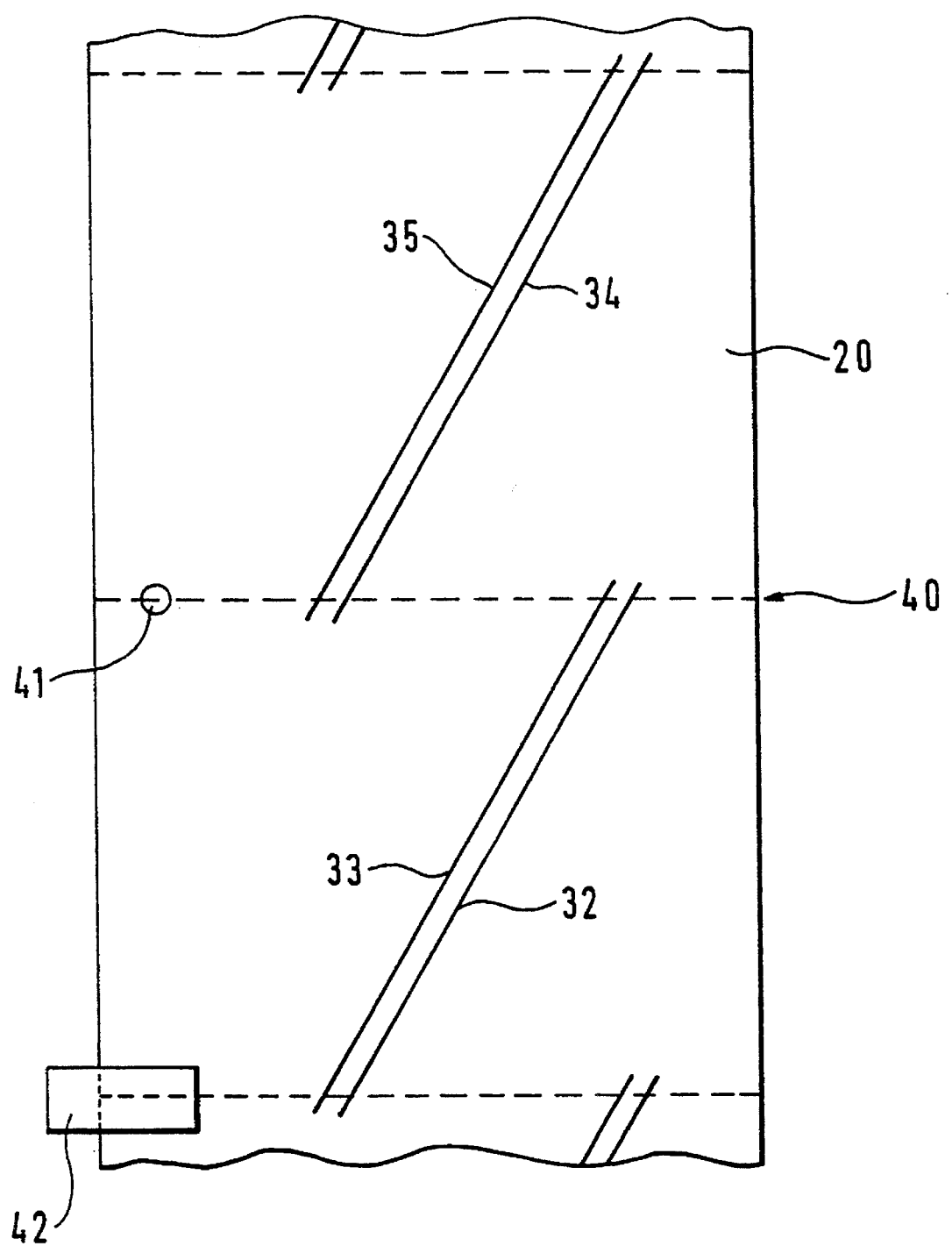
FIG. 2b is a detailed representation of the filter insert of the invention.

In a detailed view, FIG. 2b again shows the production of glue beads 32 to 35. It can be seen that the glue bead pairs overlap in a certain area. The rough filter elements are cut (separated) in this area 40.

In order to recognize the cutting position for the cutting apparatus 37, a marking 41 is applied to the filter material 20 in area 40. This marking is scanned by a sensor element 42 and initiates the cutting operation.

It is provided in certain embodiments to detect the glue bead start or glue bead end by a suitable sensor and to use this to trigger the cutting operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for producing a filter insert having a filter material folded in an accordion-shape, the method comprising the steps of:

transporting the filter material in a transport direction;

impressing fold lines into the filter material;

applying at least two glue beads to a surface of the filter material using glue application devices which are provided with glue application nozzles, the step of applying including moving at least one of the glue application devices transversely to the transport direction of the filter material over a majority of a width of the filter material;

subsequently folding the filter material along the fold lines; and cutting the folded filter material into individual filter elements with a cutting apparatus that carries out a cutting movement between said at least two glue beads.

2. Method for producing a filter insert having a filter material folded in an accordion-shape, the method comprising the steps of:

transporting the filter material in a transport direction;

impressing fold lines into the filter material;

applying at least two glue beads to a surface of the filter material using glue application devices which are provided with glue application nozzles, the step of applying including moving at least one of the glue application devices transversely to the transport direction of the filter material during the transporting of the filter material such that two of said glue beads extend obliquely to the transport direction;

subsequently folding the filter material along the fold lines; and cutting the folded filter material into individual filter elements with a cutting apparatus that carries out a cutting movement between said two obliquely extending glue beads.

3. Method according to claim 2, wherein the transversely movable glue application device has a carrier head which comprises first and second application nozzles that generate two glue beads which extend in parallel.

4. Method according to claim 3, wherein the application nozzles are offset with respect to one another in the transport direction.

5. Method according to claim 2, wherein at least a second one of the glue application devices is movable transversely with respect to the transport direction, and has a carrier head on which two glue application nozzles are arranged, and said second one of the glue application devices is offset in the transport direction with respect to the first one of the glue application devices.

6. Method according to claim 5, wherein the step of applying the glue beads generated by one of said glue application devices takes place during the transverse movement of said glue application device, and the other glue application device is moved back to a starting position during the application of the glue beads by said glue application device.

7. Method according to claim 2, further comprising cutting the folded filter material into individual filter elements with a cutting apparatus that carries out a cutting movement transversely to the transport direction of the filter material, and triggering a control signal for the cutting operation by a sensor.

8. Method according to claim 7, wherein the sensor senses at least one of: a respective glue bead end, a glue bead start and a measuring point arranged on the filter medium.

9. Method according to claim 2, further comprising generating signals via a fold adjusting device for controlling the glue application devices and the application nozzles.

10. Method according to claim 2, further comprising moving the glue application devices in the transport direction.

* * * * *